US008515712B1

(12) United States Patent
Mookerjee et al.

(10) Patent No.: US 8,515,712 B1
(45) Date of Patent: Aug. 20, 2013

(54) INFORMATION BASED OPTIMAL REDUCED STATE ESTIMATOR FOR POORLY CONDITIONED ESTIMATION PROBLEMS

(75) Inventors: Purusottam Mookerjee, Bridgewater, NJ (US); Frank J. Reifler, Cinaminson, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 420 days.

(21) Appl. No.: 12/869,125

(22) Filed: Aug. 26, 2010

(51) Int. Cl.
*G01D 1/00* (2006.01)
(52) U.S. Cl.
USPC .......................................................... 702/190
(58) Field of Classification Search
USPC ................. 702/127, 141, 142, 149, 150, 152, 702/153, 155, 175, 190, 196; 700/258
See application file for complete search history.

(56) References Cited

U.S. PATENT DOCUMENTS

| | | | |
|---|---|---|---|
| 4,179,696 A | | 12/1979 | Quesinberry et al. |
| 4,458,321 A | * | 7/1984 | Whitney et al. ............... 700/258 |
| 4,791,573 A | | 12/1988 | Zemany et al. |
| 5,432,816 A | | 7/1995 | Gozzo |
| 6,285,971 B1 | | 9/2001 | Shah et al. |
| 7,009,554 B1 | | 3/2006 | Mookerjee et al. |
| 7,180,443 B1 | | 2/2007 | Mookerjee et al. |
| 8,260,567 B1 | * | 9/2012 | Kaplan ........................ 702/142 |
| 2003/0115232 A1 | | 6/2003 | Lipp |
| 2003/0204382 A1 | * | 10/2003 | Julier et al. .................. 702/196 |
| 2004/0223480 A1 | | 11/2004 | Nguyen et al. |
| 2005/0100082 A1 | | 5/2005 | Ma |
| 2005/0128138 A1 | | 6/2005 | McCabe et al. |
| 2005/0179580 A1 | | 8/2005 | Cong et al. |

FOREIGN PATENT DOCUMENTS

| | | |
|---|---|---|
| JP | 03195989 A | 8/1991 |
| JP | 04326083 A | 11/1992 |

OTHER PUBLICATIONS

Bar-Shalom, Y., et. al., "Estimation with Applications to Tracking and Navigation", 2001, pp. 302-309.
Bar-Shalom, Y., "Update with Out-of-Sequence Measurements in Tracking: Exact Solution", IEEE Transactions on Aerospace and Electronic Systems, vol. 38, No. 3, Jul. 2002, pp. 769-778.
Portmann, G.J., et al., "Separated Covariance Filtering", IEEE International Radar Conference 1990, pp. 456-460.
Blair, W. D., et al., "Tracking Maneuvering Targets with Multiple Sensors: Does More Data Always Mean Better Estimates?", IEEE Transactions on Aerospace and Electronic Systems, vol. 32, No. 1, Jan. 1996, pp. 450-456.
Bar-Shalom, Y., et al, "One-Step Solution for the General Out-of-Sequence-Measurement Problem in Tracking", Proceedings of 2002 IEEE Aeorospace Conference Proceedings, vol. 4, pp. 1551-1559, 2002.
Malakian, K., et al , "New track-to-track association logic for almost identical multiple sensors", SPIE vol. 1481 Signal and Data Processing of Small Targets 1991, pp. 315-328.

(Continued)

*Primary Examiner* — Mohamed Charioui
(74) *Attorney, Agent, or Firm* — Howard IP Law Group, PC

(57) ABSTRACT

Information filters provide state estimation of a system when measurements provided by sensors are incomplete in that the states of the system are unobservable until a large number of measurements are collected. An example is the operation of multiple, asynchronous, one- or two-dimensional sensors to track an object in three-dimensional space. The disclosure describes an information filter that minimizes mean square estimation errors and provides accurate covariances for systems driven by unknown arbitrary time-varying inputs with unspecified dynamics but known bounds.

12 Claims, 3 Drawing Sheets

(56) References Cited

OTHER PUBLICATIONS

Li, X. R., et al., "A Survey of Maneuvering Target Tracking—Part IV: Decision-Based Methods", Proceedings of SPIE vol. 4728 (2002), pp. 511-534.

Bar-Shalom, Y., "Multitarget-Multisensor Tracking: Principles and Techniques", 1995, p. 26.

Seabald, et al., "Robust State Estimation in Uncertain Systems: Combined Detection-Estimation with incremental MSE Criterion", IEEE Transactions on Automatic Contril. vol. 22, Issue 5, Oct. 1977, pp. 821-825.

Wilkin, D. J., et al., "Target tracking algorithms for phased array radar", Radar and Signal Processing, IEE Proceedings F vol. 138, Issue 3, Jun. 1991 pp. 255-262.

Nordsjo, A.E., "Target tracking based on Kalman-type filters combined with recursive estimation of model disturbances", A.E. Radar Conference, 2005 IEEE International May 9-12, 2005, pp. 115-120.

Gelfand, S.S., et al., "Adaptive detection threshold optimization for tracking in clutter", Aerospace and Electronic Systems, IEEE Transactions on vol. 32, Issue 2., Apr. 1996, pp. 514-523.

Bruno, M.G.S., et al., "Improved particle filters for ballistic target tracking", Acoustics. Speech and Signal Processing, 2004, Proceedings, (ICASSP '04), IEEE Int'l Conference on vol. 2, May 17-21, 2004, pp. ii-705-ii-708.

Bar-Shalom, Y., et al., "Tracking and Data Association", San Diego, CA: Academic Press, Inc., 1988, Chapter 10, pp. 266-272.

Moore, J.R., et al., "Practical Aspects of Multisensor Tracking", in "Multitarget-Multisensor Tracking: Applications and Advances", vol. III, Y. Bar-Shalom and William Dale Blair, (ed.), Artech House, 2000, pp. 43-44.

* cited by examiner

INFORMATION BASED OPTIMAL REDUCED STATE ESTIMATOR FOR POORLY CONDITIONED ESTIMATION PROBLEMS

BACKGROUND

Consider a space object orbiting the Earth in a Low Earth Orbit (LEO). This space object is subject to arbitrary time-varying disturbances, with unspecified dynamics but known bounds. An example of such a disturbance is atmospheric drag, which is a function of the altitude of the orbit, the shape of the space object, atmospheric density, etc. These disturbances modify the orbit of the space object and eventually, in the absence of orbit corrections, the space object may fall to the Earth. Tracking such an object and predicting the impact point is critical to prevent loss of life and important assets on Earth. Often such an object is observed by unsynchronized sensors which measure only line-of-sight (LOS) angles, such as azimuth and elevation. Such sensors may be, for example, cameras, infrared imagers, telescopic devices, and the like. That is, at any given time, only LOS direction measurements from a single sensor are available. These sensors may be located at various points on the surface of the Earth or in space. The observations are incomplete in that they do not provide range information, thus making it impossible to locate the position with one observation. However, with multiple non-synchronous observations from a single out-of-plane sensor, or from multiple sensors, one can obtain estimates of the position and velocity states of motion of the space object in the presence of disturbances that alter the orbit of the space object.

FIG. 1A illustrates a system 8 including a three-dimensional space 10 through which a target (i.e., object of interest) T moves along a trajectory 12 in a manner such that it occupies a first location or position at a time $t_1$, a second location at a time $t_2$, and a third location at a time $t_3$. A first line-of-sight (LOS)-only sensor $S_1$ is located so that the target's position at time $t_1$ lies at an unknown range along a LOS direction $\hat{u}_1$. Such a sensor may be characterized as being "two-dimensional," as it senses only the LOS direction through angle measurements, and does not provide range measurements. Similarly, a second two-dimensional, LOS-only sensor $S_2$ is located so that the target position at time $t_2$ lies at an unknown range along a LOS direction $\hat{u}_2$, and a third two-dimensional, LOS-only sensor $S_3$ is located so that the target position at time $t_3$ lies at an unknown range along a line-of-sight direction $\hat{u}_3$. Each of the sensors $S_1$, $S_2$, and $S_3$ measures the LOS direction in three-dimensional space 10 of FIG. 1A along LOS lines $\hat{u}_1$, $\hat{u}_2$, and $\hat{u}_3$, respectively, at times $t_1$, $t_2$, and $t_3$, respectively. Each sensor $S_1$, $S_2$, and $S_3$ is capable of being slewed or pointed under control of a cueing direction control signal to aid in tracking a target. Thus, in the example of FIG. 1A, the target T has unknown dynamics and is at unknown range from each sensor. The number of sensors is three, and they are at known positions or locations. There are three reporting times, and those reporting times are known. The reporting times may be simultaneous or they may be in time sequence $t_1$, $t_2$, $t_3$. Each sensor $S_1$, $S_2$, and $S_3$ reports as a signal z the angular location of the target along a line-of-sight (LOS). In the arrangement of FIG. 1A, the single measurement provided by any one of the sensors $S_1$, $S_2$, and $S_3$ at times $t_1$, $t_2$, and $t_3$, respectively, is insufficient to provide a complete observation of the state of the target T. The information is incomplete because having only LOS direction in three dimensions is insufficient to establish range, and therefore location. While other measurements may occur, such as at times $t_2$ and $t_3$, to estimate position (location) and velocity with finite variance often requires a significant number of successive LOS direction measurements. The problems are exacerbated by the fact that the trajectory 12 taken by the target may be driven by unknown arbitrary time-varying inputs or disturbances, with unspecified dynamics but known bounds.

Information filters, as described by Y. Bar-Shalom, X. R. Li, and T. Kirubarajan, *Estimation with Applications to Tracking and Navigation: Theory, Algorithms, and Software*; New York, N.Y.: Wiley, 2001 are used in the prior art to aid in resolving problems associated with insufficient measurement. Such information filters use information matrices as opposed to covariance matrices, and are an outgrowth of Kalman filters. Covariance matrices are the inverses of information matrices whenever the inverses exist. The information filter founded on Kalman filtering has disadvantages in the context of the situation of FIG. 1A. The first disadvantage arises from the fact that the trajectory of the target may not be a path subject to dynamic modeling, but may be arbitrary, and thus such an information filter may not track properly unless an optimal process noise covariance can be chosen to model the target motion. Second, the information filter in the prior art does not always provide a trustworthy covariance matrix that accounts for the actual estimation errors. This difficulty stems from a choice of process noise covariance that may not be optimal for modeling the target motion.

Prior art includes the use of Optimal Reduced State Estimation (ORSE) using sensors which generate three-dimensional measurements of targets driven by unknown input parameters within known bounds, as described in U.S. Pat. No. 7,180,443, issued Feb. 20, 2007 in the names of Mookerjee and Reifler, and entitled Reduced State Estimator for Systems with Physically Bounded Parameters. This patent describes how to determine state estimates and state error covariance for generalized or arbitrary motion of a target or moving object where the sensors provide complete measurements. Complete measurement in this context means measurements locating a point in three dimensional space at a known time. Since the measurements are nominally complete as to angle and range from the sensor, the target location is immediately established with a well-conditioned covariance matrix. ORSE processing provides many advantages over the Kalman filter for systems in which the input parameters are unknown except for the known bounds.

Improved or alternative processing is desired for estimating systems with arbitrarily time varying, but bounded, input parameters using sensor measurements which are incomplete or whose covariance matrices are ill-conditioned.

SUMMARY

An estimator estimates the state of a system from measurements, the covariance matrices of which are singular or ill-conditioned, where the system is driven by unknown arbitrary time-varying inputs with unspecified dynamics but with known bounds. The estimator comprises an information filter. The information filter minimizes mean-square estimation errors and provides accurate state covariance matrices when sufficiently many measurements are processed for the state covariance matrices to be non-singular and well-conditioned. In a particular embodiment of the estimator, the system is a target in three-dimensional space, and the state is the location of the target.

A location estimator estimates the state of a target in three-dimensional space, where the target is driven by unknown arbitrary time-varying inputs with unspecified dynamics but known bounds. The estimator comprises an information filter that minimizes mean-square estimation errors when measurements provided by sensors are incomplete in that the states of the system cannot be estimated with a single measurement.

A location estimator estimates the state of a target in three-dimensional space, where the target is driven by unknown arbitrary time-varying inputs with unspecified dynamics but known bounds. The estimator comprises a plurality of two-dimensional, line-of-sight sensors for observing the target and for generating measurements which may be simultaneous or time-sequential, where the range from each of the sensors to the target is unobservable from a single measurement. An information filter is coupled to the sensors for providing minimized mean-square location estimation errors together with correspondingly accurate covariances. In a particular embodiment, the minimized mean-square location estimation information is tracked. In a particular version of this particular embodiment, the tracked minimized mean-square location estimation information directs the line-of-sight of the sensors.

A method estimates the location of a target in three-dimensional space, where the target is driven by unknown arbitrary time-varying inputs with unspecified dynamics but known bounds. The method comprises the step of sensing the target with a plurality of two-dimensional, line-of-sight sensors for generating simultaneous or time-sequential measurements representing the location state of the target, where the range from each of the sensors to the target is unobservable from a single measurement and the measurements are incomplete in that the states of the system are unobservable from a small number of measurements. The method further comprises the step of applying the measurements to an information filter that minimizes mean square state estimation errors and provides covariances with corresponding accuracy to thereby provide an estimate of the location of the target. In a particular mode of this method, the estimate of the location of the target as produced by the information filter is tracked over time to thereby generate a target track. In another particular mode of this method, the estimate of the location of the target as produced by the information filter controls the direction of the line-of-sight of a sensor of the plurality of sensors.

A method for estimating a state of a target comprises the steps of generating first measurements representing line-of-sight (LOS) direction to the target from a first two-dimensional sensor at a first time, generating second measurements representing LOS direction to the target from a second two-dimensional sensor at a second time, which may be later than the first time, and generating third measurements representing LOS direction to the target from a third two-dimensional sensor at a third time, which may be later than the first and second times. The method further comprises the step of, in a computer process, initializing an estimator by setting of an estimated state vector to a first initial value, the inverse of a state covariance matrix due to measurement-noise-only to a second initial value, and a bias coefficient matrix due to unknown input parameters to a third initial value. The method comprises the further step of, in a computer process, time-updating the estimated state vector, time-updating the inverse of the state covariance matrix, and time-updating the bias coefficient matrix due to unknown input parameters. In a computer process, an estimator gain matrix is computed. In a computer process, the states are measurement updated with current measurements to generate a measurement-updated estimated state vector, a measurement-updated inverse of the state covariance matrix due to measurement-noise-only, and a measurement-updated bias coefficient matrix due to unknown input parameters. The steps of time updating, determining the estimator gain matrix, and measurement updating are repeated.

A method according to an aspect of the disclosure is for estimating a state or location of a target. The method comprises the steps of generating first measurements representing LOS direction to the target from a first two-dimensional sensor at a first time, generating second measurements representing LOS direction to the target from a second two-dimensional sensor at a second time, which may be later than the first time, and generating third measurements representing LOS direction to the target from a third two-dimensional sensor at a third time, which may be later than the first and second times. The method also comprises the step of initializing an estimator by setting of the estimated state vector $\hat{x}$ to $\hat{x}(0|0)$, the inverse of the state covariance matrix M due to measurement-noise-only to $M(0|0)^{-1}$, and the bias coefficient matrix D due to unknown input parameters to $D(0|0)$. The vector $\hat{x}$ and matrices $M^{-1}$, D, are time-updated as follows. The vector $\hat{x}$ is time-updated by $$\hat{x}(k+1|k) = F\hat{x}(k|k)$$

Matrix $M^{-1}$, which is the inverse of matrix M, is time-updated by $$M(k+1|k)^{-1} = F'^{-1}M(k|k)^{-1}F^{-1}$$

The matrix D is time-updated by $$D(k+1|k) = FD(k|k) + G$$

where:
k is a time index;
F is the dynamic matrix relating the state at time index k to the state at time index k+1;
' denotes the transpose of a matrix; and
G is the input matrix relating the unknown but bounded input parameter $\lambda$ to the state at time index k+1.

The estimator gain matrix K is computed as follows:

$$U(k+1|k) = M(k+1|k)^{-1}D(k+1|k)$$

$$S(k+1|k+1)^{-1} = M(k+1|k)^{-1} - U(k+1|k)[\Lambda^{-1} + D(k+1|k)'M(k+1|k)^{-1}D(k+1|k)]^{-1}U(k+1|k)' + H'N^{-1}H$$

$$K = [S(k+1|k+1)^{-1}]^* H'N^{-1}$$

where:
S is the total mean square error matrix;
* denotes the pseudo-inverse of a matrix;
$\Lambda$ is the covariance matrix of the unknown but bounded input parameter $\lambda$;
' denotes the transpose of a matrix;
H is the measurement matrix relating the state to the measurement; and
N is the covariance matrix of the measurement noise.

The states of the target are updated with the current measurements $z(k+1)$ to generate the measurement-updated estimated state vector $\hat{x}$:

$$\hat{x}(k+1|k+1) = \hat{x}(k+1|k) + K[z(k+1) - H\hat{x}(k+1|k)]$$

as well as the measurement-updated inverse of the state covariance matrix M due to measurement-noise-only $$W(k+1|k+1) = S(k+1|k+1)^{-1}D(k+1|k+1)$$

$$M(k+1|k+1)^{-1} = S(k+1|k+1)^{-1} + W(k+1|k+1)[\Lambda^{-1} - D(k+1|k+1)'S(k+1|k+1)^{-1}D(k+1|k+1)]^{-1}W(k+1|k+1)'$$

and the measurement-updated bias coefficient matrix D due to unknown input parameters $$D(k+1|k+1) = (I - KH)D(k+1|k)$$

where I is an identity matrix.

The steps of time updating, computing the estimator gain matrix, and measurement updating are repeated.

An estimator for estimating the position and velocity states of a target comprises a first two-dimensional sensor for measuring line-of-sight direction to the target at a first time, to thereby produce first measurements representing LOS direction, a second two-dimensional sensor for measuring line-of-sight direction to the target at a second time, which may be different from, and later than, the first time, to thereby produce second measurements representing LOS direction, and a third two-dimensional sensor for measuring line-of-sight direction to the target at a third time, which may be different from, and later than, the first and second times, to thereby produce third measurements representing LOS direction. A processor is provided which includes an estimator. The processor is coupled to the first, second, and third sensors, for receiving the first, second, and third measurements representing LOS direction. The estimator further includes an initializer, for initializing the estimator by setting of the estimated state vector $\hat{x}$ to $\hat{x}(0|0)$, the inverse of the state covariance matrix M due to measurement-noise-only to $M(0|0)^{-1}$, and the bias coefficient matrix D due to unknown input parameters to $D(0|0)$. The estimator further includes a time updater for time-updating the vector $\hat{x}$ and the matrices $M^{-1}$, D. The vector $\hat{x}$ is time-updated by $$\hat{x}(k+1|k)=F\hat{x}(k|k)$$

Matrix $M^{-1}$, which is the inverse of matrix M, is time-updated by $$M(k+1|k)^{-1}=F'^{-1}M(k|k)^{-1}F^{-1}$$

The matrix D is time-updated by $$D(k+1|k)=FD(k|k)+G$$

where:
k is a time index;
F is the dynamic matrix relating the state at time index k to the state at time index k+1;
' denotes the transpose of a matrix; and
G is the input matrix relating the unknown but bounded input parameter $\lambda$ to the state at time index k+1.

The estimator further includes a gain matrix processor for computing the estimator gain matrix K by $$U(k+1|k)=M(k+1|k)^{-1}D(k+1|k)$$

$$S(k+1|k+1)^{-1}=M(k+1|k)^{-1}-U(k+1|k)[\Lambda^{-1}+D(k+1|k)'M(k+1|k)^{-1}D(k+1|k)]^{-1}U(k+1|k)'+H'N^{-1}H$$

$$K=[S(k+1|k+1)^{-1}]^*H'N^{-1}$$

where:
S is the total mean square error matrix;
* denotes the pseudo-inverse of a matrix;
$\Lambda$ is the covariance matrix of the unknown but bounded input parameter $\lambda$;
' denotes the transpose of a matrix;
H is the measurement matrix relating the state to the measurement; and
N is the covariance matrix of the measurement noise.

The estimator further includes a measurement updater for measurement updating the states with the current measurements z(k+1) to generate (a) the measurement-updated estimated state vector $\hat{x}$:

$$\hat{x}(k+1|k+1)=\hat{x}(k+1|k)+K[z(k+1)-H\hat{x}(k+1|k)]$$

(b) the measurement-updated inverse of the state covariance matrix M due to measurement-noise-only $$W(k+1|k+1)=S(k+1|k+1)^{-1}D(k+1|k+1)$$

$$M(k+1|k+1)^{-1}=S(k+1|k+1)^{-1}+W(k+1|k+1)[\Lambda^{-1}-D(k+1|k+1)'S(k+1|k+1)^{-1}D(k+1|k+1)]^{-1}W(k+1|k+1)'$$

and (c) the measurement-updated bias coefficient matrix D due to unknown input parameters $$D(k+1|k+1)=(I-KH)D(k+1|k)$$

where I is an identity matrix.
The estimator further includes a recursion loop path for repeating the steps of time updating, computing the estimator gain matrix, and measurement updating.

DETAILED DESCRIPTION

Figure 1A:
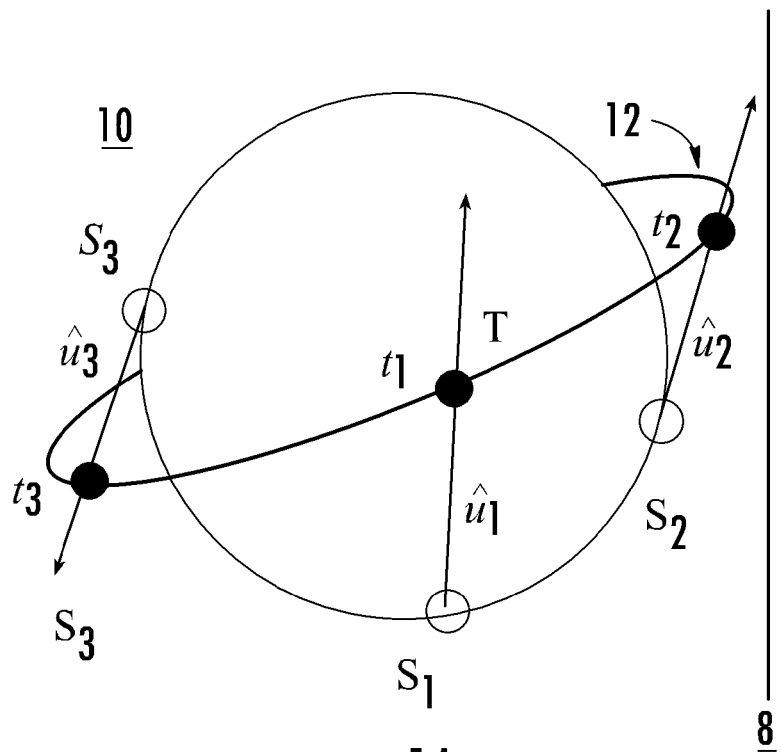
FIG. 1A illustrates a system including a simplified representation of the trajectory of a target in three-dimensional space, and illustrating a set of sensors, each of which senses LOS direction but not range.
Figure 1B:
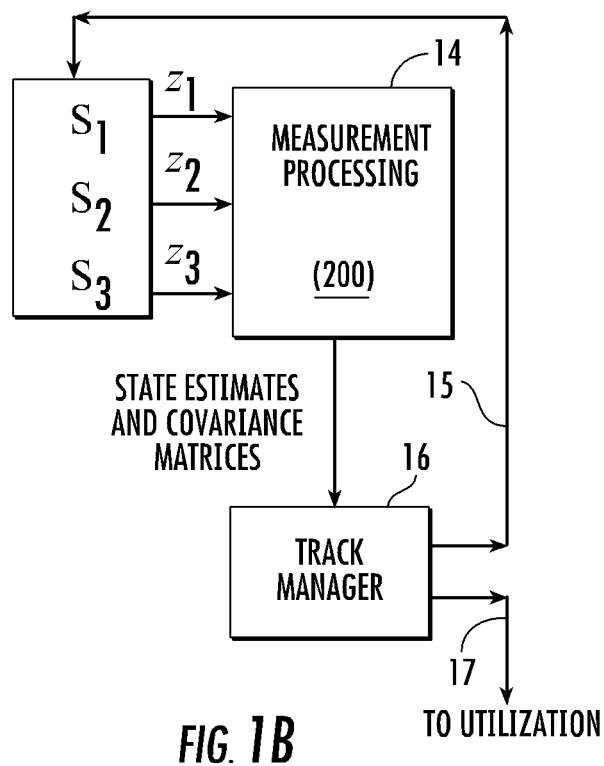
FIG. 1B illustrates a notional processor in which certain calculations are performed to estimate the state of the target together with its covariance.

FIG. 1B illustrates a block 14, which represents a localized or distributed processor which receives signals $z_1$, $z_2$, and $z_3$ representing measurements from the sensors $S_1$, $S_2$, and $S_3$, respectively, of FIG. 1A, and which processes the sensor measurements in attempting to estimate position and velocity states of the target T. In FIG. 1B, the resulting state estimates and covariance matrices are fed to a track manager, illustrated as a block 16, which determines the commands to accurately point or slew the sensors at or toward the target at the anticipated next opportunity for detecting the target. The commands are fed by way of a path 15 back to the sensors to adjust their pointing. The state estimates and covariances are also made available to user(s) by way of a path 17. The logic flow of the measurement processing to obtain state estimates and covariances is illustrated as 200 of FIG. 2.

Improved or alternative processing is desired for estimating systems with arbitrarily time varying, but bounded, input parameters using sensor measurements which are incomplete or whose covariance matrices are ill-conditioned.

As mentioned, U.S. Pat. No. 7,180,443, issued Feb. 20, 2007 in the names of Mookerjee and Reifler, entitled Reduced State Estimator for Systems with Physically Bounded Parameters, describes how to determine state estimation and state error covariance for generalized or arbitrary motion of a target or moving object where the sensors provide complete measurements, namely each measurement locating a point in three dimensional space at a known time with a non-singular measurement covariance matrix. For situations in which such measurement information is incomplete (lacking a dimension) or of poor quality in a particular direction, the equations as described in U.S. Pat. No. 7,180,443 must be modified to model the missing information.

The state estimation covariance matrix characterizes the state estimation error of a tracking filter. The inverse of the state estimation covariance matrix is known as the "state information matrix". In contrast with the covariance matrix, the state information matrix characterizes the information content of an estimation algorithm. According to an aspect of the disclosure, the Optimal Reduced State Estimator (ORSE) algorithm is recast or determined in terms of its information content, to thereby produce an Information Based Optimal Reduced State Estimator (IORSE) processing algorithm which is non-trivially different from that of the ORSE processing algorithm. More particularly, the time update equation, gain computation, and the measurement update equation in the IORSE algorithm are quite different than those used in the prior art.

Because two-dimensional sensors can provide line-of-sight (LOS) direction sensing of the target only with infinite range uncertainty, its measurement noise covariance N has infinite entries and is therefore considered ill-conditioned, in that it is not amenable to calculation. This poses a difficulty in the calculation of the filter gains and in propagating the covariance matrix of ORSE.

Figure 2:
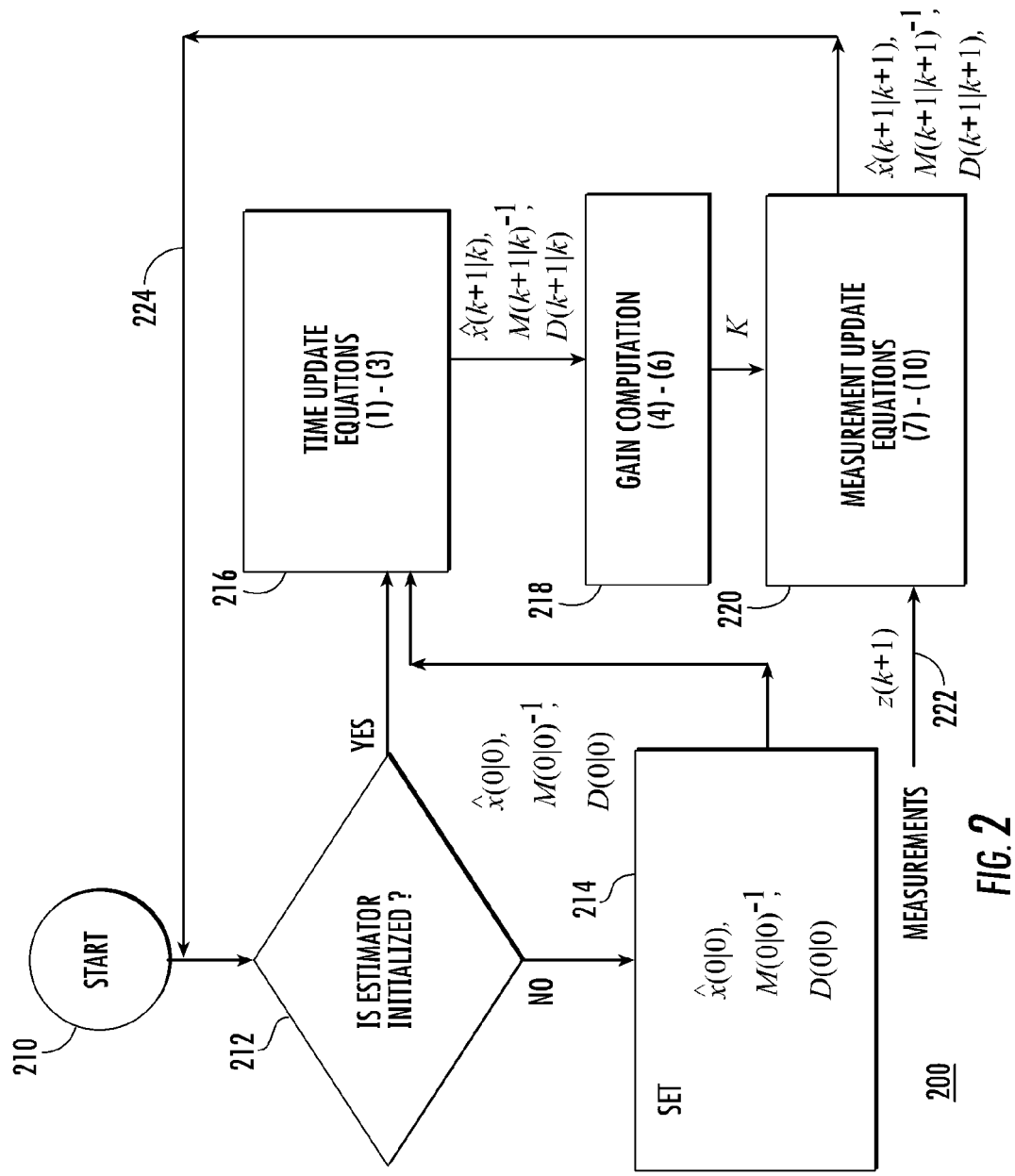
FIG. 2 is a simplified logic or control flow diagram illustrating processing according to an aspect of the disclosure.

FIG. 2 is a simplified logic flow diagram or chart 200 illustrating the computational cycle of the Information Based Optimal Reduced State Estimator (IORSE) processing algorithm 200 of processor 14 of FIG. 1B. In FIG. 2, the logic begins at a START block 210, and flows to a decision block 212, which determines if the algorithm is initialized. If the algorithm is not initialized, the logic flows by way of the NO output of block 212 to a block 214. Block 214 represents the setting of the estimated state vector $\hat{x}$ to $\hat{x}(0|0)$, the inverse of the state covariance matrix M due to measurement-noise-only to $M(0|0)^{-1}$, and the bias coefficient matrix D due to unknown input parameters to $D(0|0)$. Thus, the processing algorithm is initialized with the triplet $\hat{x}(0|0)$, $M(0|0)^{-1}$, $D(0|0)$.

Either from block 214 or from the YES output of decision block 212, the logic 200 of FIG. 2 flows to a time updating block 216. Block 216 represents the time updating of equations (1)-(3)

$$\hat{x}(k+1|k)=F\hat{x}(k|k) \tag{1}$$

$$M(k+1|k)^{-1}=F'^{-1}M(k|k)^{-1}F^{-1} \tag{2}$$

$$D(k+1|k)=FD(k|k)+G \tag{3}$$

where:
k is a time index;
F is the dynamic matrix relating the state at time index k to the state at time index k+1;
' denotes the transpose of a matrix; and
G is the input matrix relating the unknown but bounded input parameter $\lambda$ to the state at time index k+1.

From time updating block 216 of FIG. 2, the logic 200 flows to a block 218, which represents the computation of filter gain matrix K $$U(k+1|k)=M(k+1|k)^{-1}D(k+1|k) \tag{4}$$

$$S(k+1|k+1)^{-1}=M(k+1|k)^{-1}-U(k+1|k)[\Lambda^{-1}+D(k+1|k)'M(k+1|k)^{-1}D(k+1|k)]^{-1}U(k+1|k)'+H'N^{-1}H \tag{5}$$

$$K=[S(k+1|k+1)^{-1}]^*H'N^{-1} \tag{6}$$

where:
S is the total mean square error matrix;
* denotes the pseudo-inverse of a matrix
$\Lambda$ is the covariance matrix of the unknown but bounded input parameter $\lambda$;
' denotes the transpose of a matrix;
H is the measurement matrix relating the state to the measurement; and
N is the covariance matrix of the measurement noise.

From block 218 of FIG. 2, the logic 200 flows to a block 220, which represents the calculation of the measurement update equations with the latest measurements z(k+1) applied over path 222

$$\hat{x}(k+1|k+1)=\hat{x}(k+1|k)+K[z(k+1)-H\hat{x}(k+1|k)] \tag{7}$$

$$W(k+1|k+1)=S(k+1|k+1)^-D(k+1|k+1) \tag{8}$$

$$M(k+1|k+1)^{-1}=S(k+1|k+1)^{-1}+W(k+1|k+1)[\Lambda^{-1}-D(k+1|k+1)'S(k+1|k+1)^{-1}D(k+1|k+1)]^-W(k+1|k+1)' \tag{9}$$

$$D(k+1|k+1)=(I-KH)D(k+1|k) \tag{10}$$

where I is an identity matrix.

Equations (1)-(10) define an Information Optimal Reduced State Estimator (IORSE) that minimizes mean square estimation errors and provides accurate covariances for systems driven by unknown arbitrary time-varying inputs with unspecified dynamics but known bounds.

From block 220 of FIG. 2, the logic 200 flows by way of a path 224 back to decision block 212 to begin another iteration around the logic 200, with the measurement updated state vector which was determined in block 220 substituted for the previous value. The current target state estimate output of logic 200 of processor 14 is manifested on path 224, and is fed back to the sensors as a part of the tracking loop path 15 as well as to users of the estimates.

Figure 3:
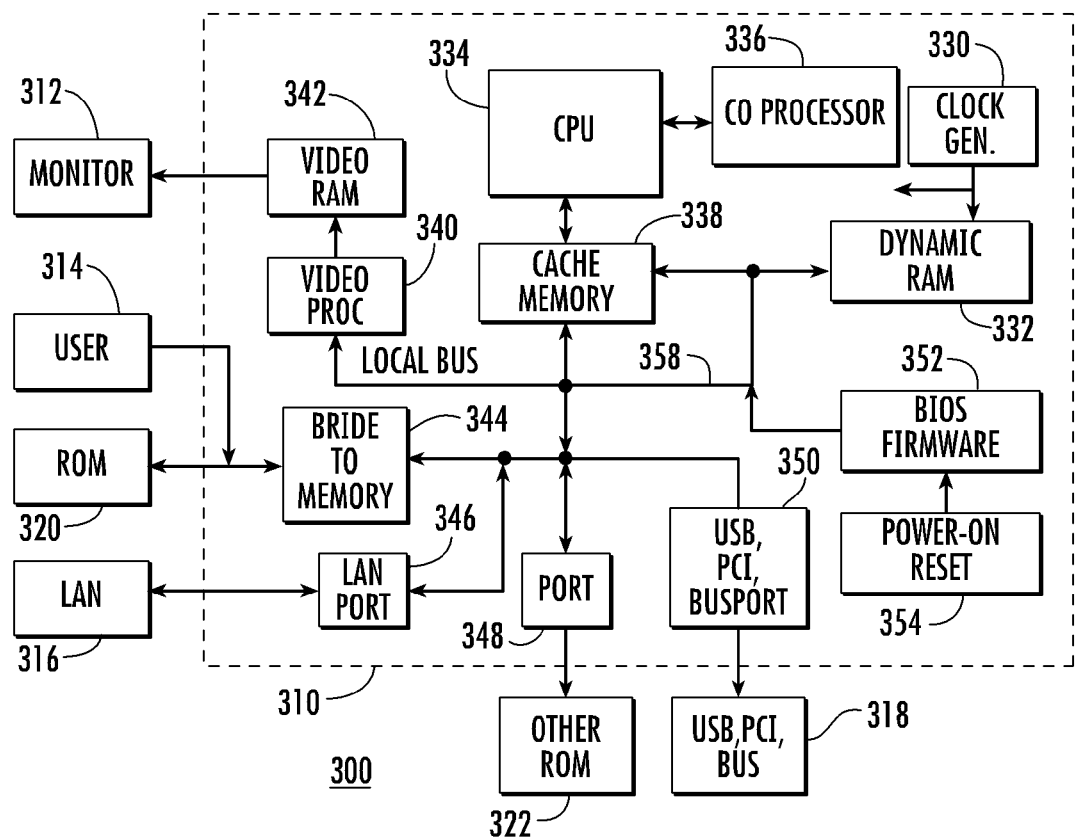
FIG. 3 is a simplified diagram in block and schematic form illustrating a representative computer or processor which may be used to aid in performing processing and calculations pursuant to the disclosure.

FIG. 3 is a simplified diagram in block and schematic form illustrating a representative computer which may be used as processor 14. In FIG. 3, computer 300 includes a processor or board 310 and outboard elements such as a monitor 312, user controls such as a keyboard and/or mouse, illustrated as a block 314, local area network (LAN) 316, additional buses 318 such as PCI and/or USB, and read-only memory (ROM) 320, which is ordinarily a hard drive, and additional ROM 322, which may be, for example, a flash memory stick or capacitance disk (CD). The main portion of the computer processor or board 310 includes a central processing unit (CPU) 334, which communicates with a cache dynamic memory 338. At initial turn-on of the computer 300, a power-on reset illustrated as a block 354 enables a preloaded basic input/output system (BIOS) flash memory, which loads cache 338 with information that initializes the booting sequence by the CPU. When booted, CPU 334 may communicate with a coprocessor illustrated as 336, and also communicates with main dynamic memory (DRAM) 332 and a local bus 358. Local bus 358 provides communication between the CPU and other elements of the computer, as for example the video processor 340 and video random-access memory 42 for driving a monitor. Local bus 58 also communicates by way of a bridge 344 to external ROM 320 and to user controls 318. Local bus 358 further communicates by way of a port 348 with other ROM 322 if desired, by way of a USB or PCI bridge or port 350 with external buses, and/or by way of a local area network (LAN) port 346 with a LAN 316. Those skilled in the art will understand how to use one or more computers to perform the processing required by elements of the disclosure.

Thus, information filters (200) provide state estimation of a system (8) when measurements provided by sensors ($S_1$, $S_2$, $S_3$) are incomplete in that the states of the system are unobservable until a large number of measurements are collected. An example is the operation of multiple, asynchronous, one- or two-dimensional sensors to track an object in three-dimensional space. In the prior art the information filter is founded on the Kalman filter. This disclosure provides an Information Optimal Reduced State Estimator (IORSE) that minimizes mean square estimation errors and provides accurate covariances for systems driven by unknown arbitrary time-varying inputs with unspecified dynamics but known bounds. The prior art of information filters based on Kalman Filters does not adequately address such inputs.

A method according to an aspect of the disclosure is for estimating the position and velocity states or location of a target (T). The method comprises the steps of generating first measurements ($z_1$) representing LOS direction to the target (T) from a first two-dimensional sensor ($S_1$) at a first time ($t_1$), generating second measurements ($z_2$) representing LOS direction to the target (T) from a second two-dimensional sensor ($S_2$) at a second time ($t_2$), which may be later than the first time ($t_1$) and generating third measurements ($z_3$) representing LOS direction to the target (T) from a third two-dimensional sensor ($S_3$) at a third time ($t_3$), which may be later than the first ($t_1$) and second ($t_2$) times. The method also comprises the step of initializing (214) an estimator (200) by setting of the estimated state vector $\hat{x}$ to $\hat{x}(0|0)$, the inverse of the state covariance matrix M due to measurement-noise-only to $M(0|0)^{-1}$, and the bias coefficient matrix D due to unknown input parameters to $D(0|0)$. The vector $\hat{x}$ and matrices $M^{-1}$, D, are time-updated (216) as follows.
The vector $\hat{x}$ is time-updated by $$\hat{x}(k+1|k)=F\hat{x}(k|k)$$

Matrix $M^{-1}$, which is the inverse of matrix M, is time-updated by $$M(k+1|k)^{-1}=F'^{-1}M(k|k)^{-1}F^{-1}$$

The matrix D is time-updated by $$D(k+1|k)=FD(k|k)+G$$

where:
k is a time index;
F is the dynamic matrix relating the state at time index k to the state at time index k+1;
' denotes the transpose of a matrix; and
G is the input matrix relating the unknown but bounded input parameter $\lambda$ to the state at time index k+1.

The estimator (200) gain matrix K is computed (218) by $$U(k+1|k)=M(k+1|k)^{-1}D(k+1|k)$$

$$S(k+1|k+1)^{-1}=M(k+1|k)^{-1}-U(k+1|k)[\Lambda^{-1}+D(k+1|k)'M(k+1|k)^{-1}D(k+1|k)]^{-1}U(k+1|k)'+H'N^{-1}H$$

$$K=[S(k+1|k+1)^{-1}]^*H'N^{-1}$$

where:
S is the total mean square error matrix;
* denotes the pseudo-inverse of a matrix;
$\Lambda$ is the covariance matrix of the unknown but bounded input parameter $\lambda$;
' denotes the transpose of a matrix;
H is the measurement matrix relating the state to the measurement; and
N is the covariance matrix of the measurement noise.

The states of the target are updated (220) with the current measurements z(k+1) to generate the measurement-updated estimated state vector $\hat{x}$ $$\hat{x}(k+1|k+1)=\hat{x}(k+1|k)+K[z(k+1)-H\hat{x}(k+1|k)]$$

as well as the measurement-updated inverse of the state covariance matrix M due to measurement-noise-only $$W(k+1|k+1)=S(k+1|k+1)^{-1}D(k+1|k+1)$$

$$M(k+1|k+1)^{-1}=S(k+1|k+1)^{-1}+W(k+1|k+1)[\Lambda^{-1}-D(k+1|k+1)'S(k+1|k+1)^{-1}D(k+1|k+1)]^{-1}W(k+1|k+1)'$$

and the measurement-updated bias coefficient matrix D due to unknown input parameters $$D(k+1|k+1)=(I-KH)D(k+1|k)$$

where I is an identity matrix.
The steps of time updating, computing the estimator gain matrix, and measurement updating are repeated.

An estimator (8) for estimating a state of a target (T) comprises a first two-dimensional sensor ($S_1$) for measuring line-of-sight direction to the target (T) at a first time ($t_1$), to thereby produce first measurements ($z_1$) representing LOS direction, a second two-dimensional sensor ($S_2$) for measuring line-of-sight direction to the target (T) at a second time ($t_2$), which may be different from, and later than, the first time ($t_1$), to thereby produce second measurements ($z_2$) representing LOS direction, and a third two-dimensional sensor ($S_3$) for measuring line-of-sight direction to the target (T) at a third time ($t_3$), which may be different from, and later than, the first and second times, to thereby produce third measurements ($z_3$) representing LOS direction. A processor (14) is provided which includes an estimator (200). The processor (14) is coupled to the first ($S_1$), second ($S_2$), and third ($S_3$) sensors, for receiving the first ($z_1$), second ($z_2$), and third ($z_3$) measurements representing LOS direction. The estimator (200) further includes an initializer (214), for initializing the estimator (200) by setting of the estimated state vector $\hat{x}$ to $\hat{x}(0|0)$, the inverse of the state covariance matrix M due to measurement-noise-only to $M(0|0)^{-1}$, and the bias coefficient matrix D due to unknown input parameters to $D(0|0)$. The estimator (200) further includes a time updater (216) for time-updating vector $\hat{x}$, and matrices $M^{-1}$, D. The vector $\hat{x}$ is time-updated by $$\hat{x}(k+1|k)=F\hat{x}(k|k)$$

Matrix $M^{-1}$, which is the inverse of matrix M, is time-updated by $$M(k+1|k)^{-1}=F'^{-1}M(k|k)^{-1}F^{-1}$$

The matrix D is time-updated by $$D(k+1|k)=FD(k|k)+G$$

where:
k is a time index;
F is the dynamic matrix relating the state at time index k to the state at time index k+1;
' denotes the transpose of a matrix; and
G is the input matrix relating the unknown but bounded input parameter $\lambda$ to the state at time index k+1.

The estimator (200) further includes a gain matrix processor (218) for computing the estimator gain matrix K by $$U(k+1|k)=M(k+1|k)^{-1}D(k+1|k)$$

$$S(k+1|k+1)^{-1}=M(k+1|k)^{-1}-U(k+1|k)[\Lambda^{-1}+D(k+1|k)'M(k+1|k)^{-1}D(k+1|k)]^{-1}U(k+1|k)'+H'N^{-1}H$$

$$K=[S(k+1|k+1)^{-1}]^*H'N^{-1}$$

where:
S is the total mean square error matrix;
* denotes pseudo-inverse of a matrix
$\Lambda$ is the covariance matrix of the unknown but bounded input parameter $\lambda$;
' denotes the transpose of a matrix;
H is the measurement matrix relating the state to the measurement; and
N is the covariance matrix of the measurement noise.

The estimator (200) further includes a measurement updater (220) for measurement updating the states with the current measurements z(k+1) to generate (a) the measurement-updated estimated state vector $\hat{x}$ $$\hat{x}(k+1|k+1)=\hat{x}(k+1|k)+K[z(k+1)-H\hat{x}(k+1|k)]$$

(b) the measurement-updated inverse of the state covariance matrix M due to measurement-noise-only $$W(k+1|k+1)=S(k+1|k+1)^{-1}D(k+1|k+1)$$

$$M(k+1|k+1)^{-1}=S(k+1|k+1)^{-1}+W(k+1|k+1)[\Lambda^{-1}-D(k+1|k+1)'S(k+1|k+1)^{-1}D(k+1|k+1)]^{-1}W(k+1|k+1)'$$

and (c) the measurement-updated bias coefficient matrix D due to unknown input parameters $$D(k+1|k+1)=(I-KH)D(k+1|k)$$

where I is an identity matrix.

The estimator (200) further includes a recursion loop path (224) for repeating the steps of time updating, computing the estimator gain matrix, and measurement updating.

What is claimed is:

1. A method for estimating a state of a target, said method comprising:
    generating first measurements representing LOS direction to the target from a first two-dimensional sensor at a first time;
    generating second measurements representing LOS direction to the target from a second two-dimensional sensor at a second time, which may be later than said first time;
    generating third measurements representing LOS direction to the target from a third two-dimensional sensor at a third time, which may be later than said first and second times;
    initializing an estimator by setting of an estimated state vector to a first initial value, the inverse of a state covariance matrix due to measurement-noise-only to a second initial value, and a bias coefficient matrix due to unknown input parameters to a third initial value;
    time-updating the estimated state vector;
    time-updating the inverse of the state covariance matrix;
    time-updating the bias coefficient matrix due to unknown input parameters;
    determining an estimator gain matrix; and
    measurement updating the states with current measurements from the first, second and third two-dimensional sensors to generate a measurement-updated estimated state vector, a measurement-updated inverse of the state covariance matrix due to measurement-noise-only, and a measurement-updated bias coefficient matrix due to unknown input parameters.

2. A method according to claim 1, wherein said step of initializing an estimator by setting of an estimated state vector to a first initialization value, the inverse of a state covariance matrix due to measurement-noise-only to a second initial value, and a bias coefficient matrix due to unknown input parameters to a third initial value includes the step of setting said estimated state vector to $\hat{x}(0|0)$, the inverse of a state covariance matrix M due to measurement-noise-only to $M(0|0)^{-1}$, and said bias coefficient matrix due to unknown input parameters to D(0|0).

3. A method according to claim 1, wherein said step of time-updating the estimated state vector comprises the steps of:
    time-updating the estimated state vector $\hat{x}$, by $$\hat{x}(k+1|k)=F\hat{x}(k|k)$$

where:
    k is a time index;
    F is the dynamic matrix relating the state at time index k to the state at time index k+1.

4. A method according to claim 1, wherein said step of time-updating the inverse of the state covariance matrix comprises the step of:
    time-updating the inverse of the state covariance matrix M by $$M(k+1|k)^{-1}=F'^{-1}M(k|k)^{-1}F^{-1}$$

where:
    k is a time index;
    F is the dynamic matrix relating the state at time index k to the state at time index k+1; and
    ' denotes the transpose of a matrix.

5. A method according to claim 1, wherein said step of time-updating the bias coefficient matrix due to unknown input parameters, comprises the step of:

$$D(k+1|k)=FD(k|k)+G$$

where:
    k is a time index;
    F is the dynamic matrix relating the state at time index k to the state at time index k+1; and
    G is the input matrix relating the unknown but bounded input parameter λ to the state at time index k+1.

6. A method according to claim 1, wherein said step of determining an estimator gain matrix, comprises the step of:
    computing the estimator gain matrix K by $$U(k+1|k)=M(k+1|k)^{-1}D(k+1|k)$$

$$S(k+1|k+1)^{-1}=M(k+1|k)^{-1}-U(k+1|k)[\Lambda^{-1}+D(k+1|k)'M(k+1|k)^{-1}D(k+1|k)]^{-1}U(k+1|k)'+H'N^{-1}H$$

$$K=[S(k+1|k+1)^{-1}]*H'N^{-1}$$

where:
    k is a time index;
    M is the state covariance matrix;
    D is the bias coefficient matrix due to unknown input parameters;
    S is the total mean square error matrix;
    \* denotes pseudo-inverse of a matrix;
    Λ is the covariance matrix of the unknown but bounded input parameter λ;
    ' denotes the transpose of a matrix;
    H is the measurement matrix relating the state to the measurement; and
    N is the covariance matrix of the measurement noise.

7. A method according to claim 1, wherein said step of measurement updating the states with current measurements to generate a measurement-updated estimated state vector, a measurement-updated inverse of the state covariance matrix due to measurement-noise-only, and a measurement-updated bias coefficient matrix due to unknown input parameters, comprises the steps of:
    measurement updating the states with the current measurements z(k+1) to generate the measurement-updated estimated state vector $\hat{x}$ $$\hat{x}(k+1|k+1)=\hat{x}(k+1|k)+K[z(k+1)-H\hat{x}(k+1|k)],$$

where:
    k is a time index;
    K is the estimator gain matrix; and
    H is the measurement matrix relating the state to the measurement;
    measurement updating the inverse of the state covariance matrix M due to measurement-noise-only to generate the measurement-updated inverse of the state covariance matrix due to measurement-noise-only $$W(k+1|k+1)=S(k+1|k+1)^{-1}D(k+1|k+1)$$

$$M(k+1|k+1)^{-1}=S(k+1|k+1)^{-1}+W(k+1|k+1)[\Lambda^{-1}-D(k+1|k+1)'S(k+1|k+1)^{-1}D(k+1|k+1)]^{-1}W(k+1|k+1)'$$

where:
k is a time index;
S is the total mean square error matrix;
D is the bias coefficient matrix due to unknown input parameters;
M is the state covariance matrix;
$\Lambda$ is the covariance matrix of the unknown but bounded input parameter $\lambda$;
' denotes the transpose of a matrix; and
measurement updating the bias coefficient matrix D due to unknown input parameters $$D(k+1|k+1)=(I-KH)D(k+1|k)$$

where:
k is a time index;
I is an identity matrix of same dimension as that of the state vector;
K is the estimator gain matrix; and
H is the measurement matrix relating the state to the measurement.

8. An estimator for determining a state of a target, said estimator comprising:
a processor responsive to measurement data representing the state of one of more targets received from sensors, the processor configured to:
generate:
an initial estimated target state vector;
an initial inverse target state covariance matrix due to measurement-noise-only; and
an initial bias coefficient matrix due to unknown input parameters;
determine a gain matrix; and
update the target state vector with current measurement data to generate a measurement-updated estimated state vector, a measurement-updated inverse of the state covariance matrix due to measurement-noise-only, and a measurement-updated bias coefficient matrix due to unknown input parameters.

9. The estimator of claim 8, wherein the measurement data from the sensors represents line-of-sight direction to the target received from a first two-dimensional sensor, a second two-dimensional sensor, and a third two-dimensional sensor.

10. A method for estimating a state of a target, said method comprising:
generating first measurements representing LOS direction to the target from a first two-dimensional sensor at a first time;
generating second measurements representing LOS direction to the target from a second two-dimensional sensor at a second time, which may be later than said first time;
generating third measurements representing LOS direction to the target from a third two-dimensional sensor at a third time, which may be later than said first and second times;
initializing an estimator by setting of an estimated state vector $\hat{x}$ to $\hat{x}(0|0)$, the inverse of the state covariance matrix M due to measurement-noise-only to $M(0|0)^{-1}$, and the bias coefficient matrix D due to unknown input parameters to $D(0|0)$;

time-updating $\hat{x}$, by $$\hat{x}(k+1|k)=F\hat{x}(k|k)$$

time-updating the inverse of M by $$M(k+1|k)^{-1}=F'^{-1}M(k|k)^{-1}F^{-1}$$

time-updating D, by $$D(k+1|k)=FD(k|k)+G$$

where:
k is a time index;
F is the dynamic matrix relating the state at time index k to the state at time index k+1;
' denotes the transpose of a matrix; and
G is the input matrix relating the unknown but bounded input parameter $\lambda$ to the state at time index k+1;
computing the estimator gain matrix K by $$U(k+1|k)=M(k+1|k)^{-1}D(k+1|k)$$

$$S(k+1|k+1)^{-1}=M(k+1|k)^{-1}-U(k+1|k)[\Lambda^{-1}+D(k+1|k)'D(k+1|k)]^{-1}U(k+1|k)'+H'N^{-1}H$$

$$K=[S(k+1|k+1)^{-1}]^*H'N^{-1}$$

where:
S is the total mean square error matrix;
* denotes pseudo-inverse of a matrix
$\Lambda$ is the covariance matrix of the unknown but bounded input parameter $\lambda$;
' denotes the transpose of a matrix;
H is the measurement matrix relating the state to the measurement; and
N is the covariance matrix of the measurement noise; and
measurement updating the states with the current measurements z(k+1) from the first, second and third two-dimensional sensors to generate the measurement-updated estimated state vector $\hat{x}$ $$\hat{x}(k+1|k+1)=\hat{x}(k+1|k)+K[z(k+1)-H\hat{x}(k+1|k)],$$

the measurement-updated inverse of the state covariance matrix M due to measurement-noise-only $$W(k+1|k+1)=S(k+1|k+1)^{-1}D(k+1|k+1)$$

$$M(k+1|k+1)^{-1}=S(k+1|k+1)^{-1}+W(k+1|k+1)[\Lambda^{-1}-D(k+1|k+1)'S(k+1|k+1)^{-1}D(k+1|k+1)]^{-1}W(k+1|k+1)'$$

as well as the measurement-updated bias coefficient matrix D due to unknown input parameters $$D(k+1|k+1)=(I-KH)D(k+1|k)$$

where I is an identity matrix.

11. A system for estimating a state of a target, said system comprising:
a first two-dimensional sensor for measuring line-of-sight direction to the target at a first time, to thereby produce first measurements representing LOS direction;
a second two-dimensional sensor for measuring line-of-sight direction to the target at a second time, which may be different from said first time, to thereby produce second measurements representing LOS direction;
a third two-dimensional sensor for measuring line-of-sight direction to the target at a third time, which may be different from said first and second times, to thereby produce third measurements representing LOS direction;
a processor including an estimator, said processor being coupled to said first, second, and third sensors, for receiving said first, second, and third measurements representing LOS direction, said estimator further including
an initializer, for initializing the estimator by setting of an estimated state vector $\hat{x}$ to $\hat{x}(0|0)$, the inverse of the state covariance matrix M due to measurement-noise-only to $M(0|0)^{-1}$, and the bias coefficient matrix D due to unknown input parameters to $D(0|0)$;

a time updater for time-updating $\hat{x}$, by $$\hat{x}(k+1|k)=F\hat{x}(k|k)$$

a time updater for time-updating the inverse of M by $$M(k+1|k)^{-1}=F'^{-1}M(k|k)^{-1}F^{-1} \text{ and}$$

a time updater for time-updating D, by $$D(k+1|k)=FD(k|k)+G$$

where:
k is a time index;
F is the dynamic matrix relating the state at time index k to the state at time index k+1;
' denotes the transpose of a matrix; and
G is the input matrix relating the unknown but bounded input parameter $\lambda$ to the state at time index k+1;

a gain matrix processor for computing the estimator gain matrix K by $$U(k+1|k)=M(k+1|k)^{-1}D(k+1|k)$$

$$S(k+1|k+1)^{-1}=M(k+1|k)^{-1}-U(k+1|k)[\Lambda^{-1}+D(k+1|k)'M(k+1|k)^{-1}D(k+1|k)]^{-1}U(k+1|k)'+H'N^{-1}H$$

$$K=[S(k+1|k+1)^{-1}]^{*}H'N^{-1}$$

where:
S is the total mean square error matrix;
* denotes pseudo-inverse of a matrix;
$\Lambda$ is the covariance matrix of the unknown but bounded input parameter $\lambda$;
' denotes the transpose of a matrix;
H is the measurement matrix relating the state to the measurement; and
N is the covariance matrix of the measurement noise; and a measurement updater for measurement updating the states with the current measurements $z(k+1)$ from the first, second and third two-dimensional sensors to generate (a) the measurement-updated estimated state vector $\hat{x}$ $$\hat{x}(k+1|k+1)=\hat{x}(k+1|k)+K[z(k+1)-H\hat{x}(k+1|k)]$$

(b) the measurement-updated inverse of the state covariance matrix M due to measurement-noise-only $$W(k+1|k+1)=S(k+1|k+1)^{-1}D(k+1|k+1)$$

$$M(k+1|k+1)^{-1}=S(k+1|k+1)^{-1}+W(k+1|k+1)[\Lambda^{-1}-D(k+1|k+1)'S(k+1|k+1)^{-1}D(k+1|k+1)]^{-1}W(k+1|k+1)'$$

and (c) the measurement-updated bias coefficient matrix D due to unknown input parameters $$D(k+1|k+1)=(I-KH)D(k+1|k)$$

where:
I is an identity matrix of same dimension as that of the state vector.

12. A system for estimating a state of a target, said system comprising:
a first two-dimensional sensor for measuring line-of-sight direction to the target at a first time, to thereby produce first measurements representing LOS direction;
a second two-dimensional sensor for measuring line-of-sight direction to the target at a second time, which may be different from said first time, to thereby produce second measurements representing LOS direction;
a third two-dimensional sensor for measuring line-of-sight direction to the target at a third time, which may be different from said first and second times, to thereby produce third measurements representing LOS direction; and
a processor including an estimator, said estimator further including an initializer for initializing the estimator by setting of an estimated state vector to a first initial value, the inverse of a state covariance matrix due to measurement-noise-only to a second initial value, and a bias coefficient matrix due to unknown input parameters to a third initial value, said processor being coupled to said first, second, and third sensors, for receiving said first, second, and third measurements representing LOS direction, said processor configured to:
time-update the estimated state vector;
time-update the inverse of the inverse of the state covariance matrix;
time-update the bias coefficient matrix due to unknown input parameters;
determine an estimator gain matrix; and
measurement update the states with the current measurements from the first, second and third two-dimensional sensors to generate a measurement-updated estimated state vector, a measurement-updated inverse of the state covariance matrix due to measurement-noise-only, and a measurement-updated bias coefficient matrix due to unknown input parameters.

\* \* \* \* \*